Patented May 20, 1924.

1,494,400

UNITED STATES PATENT OFFICE.

ALOIS ZINKE AND ALBERT KLINGLER, OF GRAZ, AUSTRIA, ASSIGNORS, BY MESNE ASSIGNMENTS, TO PERYLENE COMPANY, INC., OF NEW YORK, N. Y.

DYE FROM DIOXYPERYLENE.

No Drawing.   Application filed June 9, 1923.   Serial No. 644,464.

*To all whom it may concern:*

Be it known that we, ALOIS ZINKE and ALBERT KLINGLER, citizens of the Republic of Austria, residing at Graz, Styria, Republic of Austria, have invented certain new and useful Improvements in Dyes from Dioxyperylene, of which the following is a specification.

This invention relates to the manufacture of a dye from dioxyperylene and consists in introducing sulphur into dioxyperylene.

By the following example of carrying the process into practice a black sulphur dye is obtained dyeing from the vat.

One part by weight of dioxyperylene (1:12) is melted together with one part by weight of sodium sulphite and two parts by weight of sulphur and is heated for some time, say half an hour to a temperature of 200 to 300° centigrade. The molten mass is lixivated with water and the dye remains as a residue in the form of a black powder and may be purified by dissolving it in sodium sulphite and reprecipitating it. This new dye is soluble in concentrated sulphuric acid in the heat with a blue violet colour but insoluble in water, alcohol and glacial acetic acid; in an alkaline aqueous solution of sodium hydrosulphite it gives a vat of an impure violet colour which according to its concentration dyes cotton from brown to black with brown tinge. This colour is so fast against acids, that even rather concentrated hydrochloric acids do not dissolve out anything of the colour or do change it. The colour is also fast against alkalies and light and indifferent to a solution of sodium hypochlorite.

Instead of treating dioxyperylene with sulphur and an alkali sulphite as above described it may also be treated with the same result with hydroxides of alkalies and sulphur.

It is our belief that by the treatment above described a compound is formed which is a sulphurized perylene derivative although at present the constitutional formula of the new derivative, which constitutes a very valuable dye, cannot be given.

What we claim is:

As a new product of manufacture a sulphurized derivative of perylene substantially as described.

In testimony whereof we have affixed our signatures in presence of two witnesses.

ALOIS ZINKE.
ALBERT KLINGLER.

Witnesses:
ARTHUR BAUMANN,
CARL COUDENHON.